United States Patent

Sacks

[15] 3,694,771

[45] Sept. 26, 1972

[54] MAGNETICALLY ACTUATED TUNING METHOD FOR GUNN OSCILLATORS

[72] Inventor: Barry H. Sacks, Berkeley, Calif.

[73] Assignee: The United States of America as represented by the Administrator of the National Aeronautics and Space Administration

[22] Filed: Aug. 30, 1971

[21] Appl. No.: 175,881

[52] U.S. Cl. ........331/107 G, 317/234 V, 317/235 K, 317/235 AG, 331/90, 331/177 R

[51] Int. Cl. ................................................H03b 7/00

[58] Field of Search ................331/107 G, 117 R, 90; 317/234 V, 235 H, 235 K, 235 AG

[56] References Cited

UNITED STATES PATENTS

| | | | |
|---|---|---|---|
| 3,453,502 | 7/1969 | Sandbank | 331/107 G X |
| 3,453,560 | 7/1969 | Swartz | 331/107 R |
| 3,634,780 | 1/1972 | Bosch et al. | 331/107 G |

FOREIGN PATENTS OR APPLICATIONS

| | | | |
|---|---|---|---|
| 1,130,657 | 10/1968 | Great Britain | 331/107 G |

OTHER PUBLICATIONS

Steele, " Magnetic Tuning of Gunn Effect Oscillators," RCA Technical Notes, No. 663, pp. 1,2, November 1965.

*Primary Examiner*—Roy Lake
*Assistant Examiner*—Siegfried H. Grimm
*Attorney*—John R. Manning et al.

[57] ABSTRACT

A tunable microwave generator based on the Gunn effect is disclosed. The generator includes a semiconductor material which exhibits the Gunn effect when current flows therethrough between anode and cathode end contacts. The material has a plurality of sides each with a scratch at a different distance from the anode contact. A magnetic field is produced by a magnet placed about the semiconductor field. The Lorentz force produced as a function of the current flow and the magnetic field drive the electrons to the surface of one of the sides to cause nucleation to occur at the scratch. When a domain is formed thereat it travels to the anode contact to provide pulses at a frequency which is related to the distance between the scratch and the anode contact.

16 Claims, 4 Drawing Figures

BARRY H. SACKS
*INVENTOR.*

BY [signatures]
ATTORNEYS

MAGNETICALLY ACTUATED TUNING METHOD FOR GUNN OSCILLATORS

ORIGIN OF INVENTION

The invention described herein may be manufactured and used by or for the United States Government without payment of any royalty thereon or therefor.

BACKGROUND OF THE INVENTION

1. Field of the Invention

The present invention relates to oscillators and, more particularly, to a new microwave generator using the Gunn effect.

2. Description of the Prior Art

As is appreciated, the Gunn effect relates to a phenomenon in semiconductor materials subjected to an electric field. When the electric field in certain semiconductor materials reaches a threshold value, a sufficient number of conduction electrons acquire an energy which enables them to transfer from the central conduction band, where they are highly mobile, to "-satellite bands," where their mobility is substantially reduced. Thus the transfer leads to a reduced current as the electric field is increased and hence to a negative differential conductivity. This negative conductivity, in turn, results in the accumulation of space charge by the inverse of the dielectric relaxation process. Alternately stated, the less mobile electrons tend to pile up, while the more mobile electrons move away. This accumulation occurs at a nucleation point which is usually in the region of the cathode contact of the device. When the accumulation reaches a certain level, the ensemble of electrons, known as a domain, detaches itself from the nucleation point and travels the length of the semiconductor material, and, upon arriving at the anode contact, delivers a pulse of current to the circuit. In general the domains nucleate very rapidly compared to the transit time, and, at any given time there is only one domain travelling across the device. As soon as the domain has reached the anode and delivered its current pulse, a new domain nucleates at the cathode and begins its transit. The domain velocity is in general constant in any material. Thus, the transit time of the space charge domain across the device is equal to the period of the microwave oscillation and the frequency is simply determined by the length of the device. Therefore, each device of a fixed length can only provide a fixed microwave frequency. Generators or oscillators using the Gunn effect and known Gunn devices are presently commercially available.

Although most of the available Gunn devices operate at a fixed frequency, various techniques and methods of tuning them, so as to convert them into variable frequency devices have been attempted and developed. However, all such methods and techniques are very complicated, requiring complex and expensive electronic equipment which greatly increase the cost of such tunable Gunn devices. Thus, a need exists for a new tunable Gunn device which is easily tunable and which is less complex and expensive than those presently known in the art.

OBJECTS AND SUMMARY OF THE INVENTION

It is a primary object of the present invention to provide a new improved tunable Gunn device.

It is another object of the present invention to provide a new Gunn device whose frequency is equally and accurately tunable by relatively simple means.

A further object of the present invention is to provide a new method of varying the frequency of a device in which microwave frequencies are generated as a result of the Gunn effect.

It is a further object of the present invention to provide a new relatively simple and inexpensive tunable Gunn device for producing microwave energy at a frequency within a selected frequency range.

These and other objects of the present invention are achieved by controlling the nature of the surface of the semiconductor material and by the use of a magnetic field, oriented, in a manner to be described later, so as to drive the electrons to the surface and cause nucleation to occur thereat at a preselected distance from the anode, thereby controlling the output frequency. Briefly, it has been discovered that a magnetic field oriented in a direction traverse to the current direction drives the electrons to the surface of the material thereby changing the domain nucleation characteristics markedly. These characteristics are noticably dependent on the nature of the surface treatment. In accordance with the present invention, the surface of the material is scored or scratched so that when a magnetic field is applied, the scoring point serves as a point of nucleation for the domain. Thus the output frequency is dependent on the distance between such a point and the anode. By controlling the point at which nucleation of the domain occurs, the output frequency is controlled.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
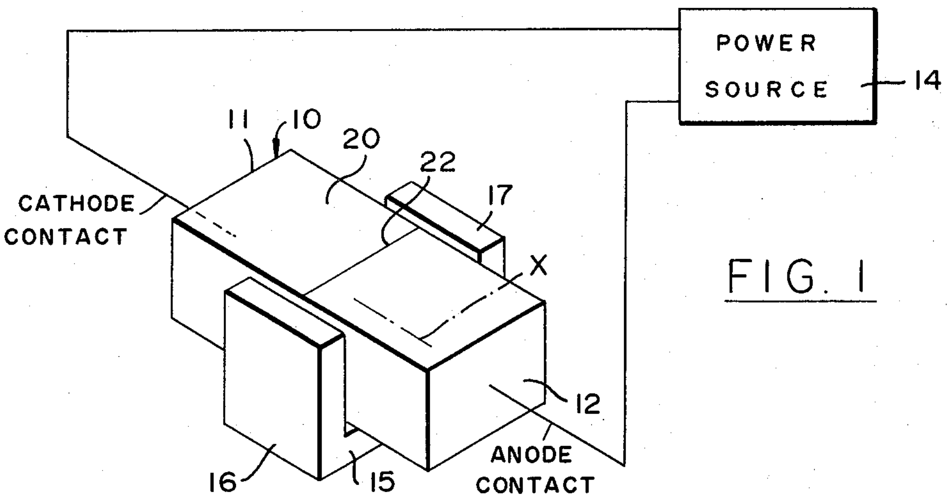
FIG. 1 is a block diagram useful in explaining the principles of the invention.

Reference is first made to FIG. 1 which is an isometric view of a relatively simple embodiment of the present invention which is useful to explain the basic principles and mode of operation of the invention.

In the particular embodiment, the semiconductor material which exhibits a Gunn effect, is designated by block 10. It is shown as a rectangular prism shown with two opposite ends 11 and 12 positioned along its longitudinal axis, designated as X. Ends 11 and 12 define the cathode and anode contacts respectively of the device, with the two contacts being shown connected to an appropriate source of electric power, designated by reference numeral 14. Associated with the semiconductor block 10 is a magnet 15 whose poles 16 and 17 are positioned on opposite sides of the block so as to produce a magnetic field in a Y axis, which is perpendicular to the X axis. The top surface 20 of block 10, which is in a plane parallel to the XY plane has a scratch or scoring therein at a preselected distance from the anode contact 12. The scratch or scoring is designated by line 22.

Figure 2:
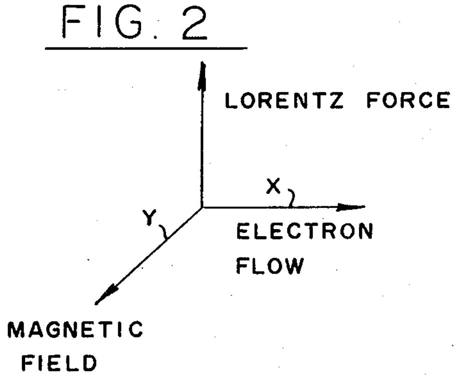
FIG. 2 is a force diagram.

As shown in FIG. 2, assuming that the electron flow is in the X axis and the magnetic field, produced by magnet 15 is in the Y axis, the Lorentz force is in a Z axis which is perpendicular to the XY plane. Thus in the present invention, the Lorentz force is toward the scratch 22.

It has been discovered that when the magnetic field is applied while current flows through the block 10, the Lorentz force drives electrons toward the upper surface 20, thereby increasing electron concentration near it. In the vicinity of the imperfection, i.e., the scratch 22, an inhomogeneity of the electric field is produced, thereby increasing the concentration of electrons thereat, which leads to nucleation of a space charge domain at the scratch. Thus, when the concentration reaches the necessary level, the domain detaches itself from the block at and near the scratch 22 and travels from the scratch to the anode 12 delivering a pulse of current thereat.

Since as previously pointed out, the domains nucleate rapidly compared to the transit time and since there is only one domain traveling across the block at any given time, it should be apparent from the foregoing, that the frequency of the pulses arriving at the anode 12 is a function of the distance between the scratch 22 and anode 12. Thus this distance controls the output frequency. Since in block 10 only a single scratch is provided, the particular embodiment shown in FIG. 1 is one capable of producing only an output at a fixed predefined frequency.

Figure 3:
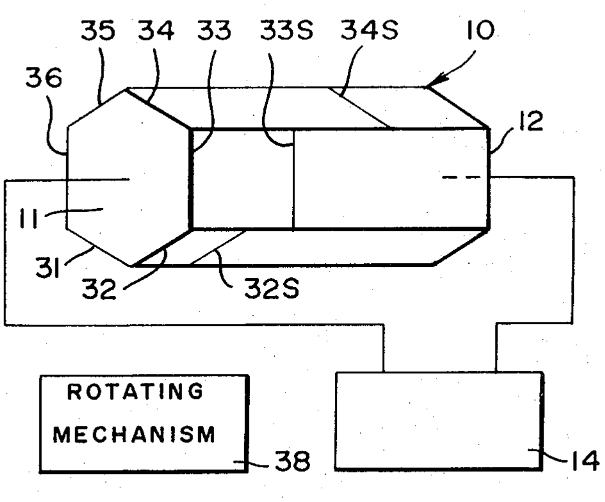
FIGS. 3 and 4 are partial block diagrams of two different embodiments of the invention.

However, the basic principles governing the operation shown in FIG. 1 may be extended to provide a device which is easily tunable at any one of a plurality of discrete frequencies. Such a device is shown in FIG. 3 wherein block 10 is represented as a six-sided prism. The six sides are designated by numerals 31 through 36 respectively. Each of the sides defines a scratch which is at a different distance from the anode contact 12. The six scratches are designated by the sides' reference numerals followed by the suffix S. In FIG. 3 the magnet 15 is deleted for clarity purposes.

In operation, tuning is achieved by simply rotating the block or prism 10 around its longitudinal X axis so as to bring a side having a scratch at a particular selected distance from the anode to be at the top, perpendicular to the Lorentz force and parallel to the XY plane, when the magnetic field is applied. When such a field is applied and current flows through block 10, domain nucleation occurs at the scratch which is at the selected distance from the anode, thereby controlling the output frequency of the device. Assuming that the distance from the scratch furthest from the anode contact is L, digital tuning may be provided by controlling the other five scratches to be at distances from the anode of ½ L, ¼ L, ⅛ L, 1/16 L and 1/32 L. Thus, when the scratch at a distance L from the anode is at the top and nucleation occurs thereat, a first output frequency is produced. On the other hand, when the surface whose scratch is at the distance of 1/32 L is at the top, a frequency 32 times as great as the first output frequency is produced. The rotation of block 10 may be accomplished with any appropriate mechanism, coupled to the block. For simplicity the rotating mechanism is represented by block 38.

Figure 4:
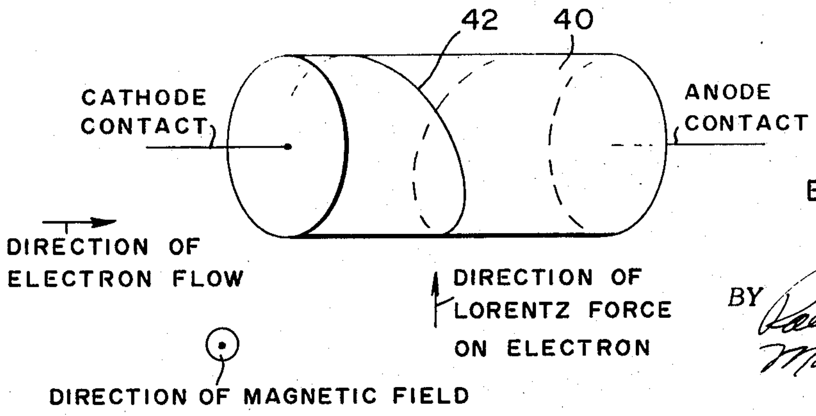

The teachings of the present invention may be extended to provide an oscillator with continuous tuning rather than discrete frequency tuning. This may be accomplished by using semiconductor material in the shape of a cylinder, as shown in FIG. 4 to which reference is made herein, wherein the cylinder is designated by numeral 40. On its outside surface a scratch in the shape of a single helix 42 is produced. Again, tuning is achieved, by simply rotating cylinder 40 about its longitudinal X axis to bring to the top a point on the helix which is at a selected distance from the anode 12. Domain nucleation occurs thereat which results in the production of microwave pulses at a frequency which is directly relaxed to the distance of the particular selected point on the helix from the anode. If desired, in the embodiments of FIGS. 3 and 4, the magnet 15 rather than the semiconductor material may be rotated about the X axis.

In FIG. 4 the scratch is in the shape of a single helix 42. If desired the scratch may be in the form of a multiturn helix, such as a screw thread. In such an embodiment the magnet pole means must have a longitudinal dimension smaller than the distance between two full turns. However the pole pieces must be long enough so that the magnetic field extends over a great enough length to allow the magnetically induced deflection of electrons to bring them to the surface in sufficient quantity to form the domain.

From the foregoing it should thus be appreciated that in accordance with the present invention, the surface rather than the bulk of the semiconductor material is used as the point of domain nucleation, and that the Lorentz force produced by a magnetic field acting on the current passing through the semiconductor material is used to drive the electrons to a predefined point on the surface. The point is represented by the scratch or the scoring. To insure that nucleation occurs at the selected point, it is important that the surface of the semiconductor material be highly polished or smooth except at the point at which it is scored. Such scoring can be accomplished with either chemical means or by any other technique with which accurate scoring positioning can be accomplished. For example, presently known laser micromachining techniques are accurate to better than 1 micron tolerance.

Herebefore the force which drives the electrons to the surface has been described as the Lorentz force produced by a magnetic field acting on the current passing through the material. The Lorentz force is but one example of a force capable of driving the electrons to the scratch at a material surface. The same effect can be achieved by an electrostatic force in the same direction as the Lorentz force.

As is known generally a Gunn oscillator which is a microwave oscillator is placed in a resonant cavity into which it radiates power, and from which the useful power is then drawn. If the natural frequency of the oscillator is different from one of the resonant frequencies of the cavity, an interaction occurs in which the power in the cavity causes the creation of a "virtual anode" inside the oscillator, thus modifying its "effective length" and hence its generation frequency. If a small sphere of YIG (Yttrium Iron Garnet) is placed at an appropriate location in the cavity and a d.c. magnetic field applied to it, its properties are such that it modifies the resonant frequencies of the cavity, with the magnitude of the modification proportional to the strength of the magnetic field.

Any of the embodiments of the present invention may be placed in such a cavity with the YIG sphere and the whole cavity placed between the pole pieces of the magnet, which would provide the magnetic field for both the oscillator and the sphere. Mechanical connections would be provided to rotate the oscillator with respect to the magnetic field direction. In such an arrangement the effective cathode represented by the point of nucleation is controlled by the rotation of the semiconductor material while the effective anode is controlled by controlling the strength of the magnetic field. Thus material rotation would provide coarse tuning and field strength variation would provide fine tuning.

One material which has found wide usage in the manufacture of Gunn oscillators is gallium arsenide (GaAs) which has a carrier speed of about $10^7$ cm per second. Thus such a device operating in the simple transit time mode at the frequency of 10 GHZ will be $10\mu$ in length. Since laser micro-machining is accurate to better than $1\mu$ tolerance, it can be used to scribe or scratch the surface of the gallium arsenide as herein before described. Generally, the higher frequency Gunn oscillators, in the range of 10 GHZ and above, are fabricated by the epitaxial growth of relatively pure GaAs on N+ substrates, which serve as one of the contacts, followed by the deposition of another layer on $N^{30}$ GaAs which is the other contact. Embodiments actually reduced to practice, indicate that the effective concentration of electrons near the surface necessary for domain nucleation at a surface can be achieved with a magnetic field below 5 kilogauss. In view of the small dimensions of the semiconductor material, the magnet itself could be made to be very small in volume, for example, less than 1 cubic cm, with closely spaced pole pieces to concentrate the field across the semiconductor material As is appreciated by those familiar with the Gunn oscillators for such an oscillator to operate the product of the electron density of the material, defined as $n$, times the length of domain travel, defined as $d$ must be greater than a quantity derived from the constants of the material in particular those parameters associated with the inverse dielectric relaxation process. As is known the electron density $n$ can be controlled by the materials manufacturer over a wide range. In GaAs the constant quantity os approximately $10^{12}$ cm$^{-2}$. To insure that nd is greater than this quantity, restraints must be placed on the minimum value of $d$. Although n can be increased, in practice it should not be made so high to cause excessive material heating and possible burn out. As is known when $n$ is made high operation efficiency is reduced.

Although particular embodiments of the invention have been described and illustrated herein, it is recognized that modifications and variations may readily occur to those skilled in the art and consequently it is intended that the claims be interpreted to cover such modifications and equivalents).

What is claimed is:

1. A frequency generator comprising:

a block of predetermined configuration of a semiconductor material which is capable of exhibiting Gunn effect characteristics, said block having first and second sides, disposed at opposite ends of a longitudinal axis of said block, and at least one additional side parallel to said longitudinal axis, said additional side defining a scratch therein;

a source of electrical current;

means connecting said first and second sides to said source to cause a current to flow in said block between said first and second sides in a direction aligned with said longitudinal axis; and magnetic means positioned about said block for producing a magnetic field in a direction perpendicular to said longitudinal axis and parallel to said additional side, with the Lorentz force produced as a function of said magnetic field and the current directed toward said additional side.

2. The arrangement as recited in claim 1 wherein said block has a configuration of a multisided prism, with said first and second sides being the top and bottom of said prism and a plurality of additional sides extending from said first and second sides, each additional side defining a scratch therein at a different distance from a selected one of said first and second sides, each scratch being in a direction parallel to said selected one side, with one of said additional sides being in a plane perpendicular to the direction of said Lorentz force.

3. The arrangement as recited in claim 2 further including means for rotating said prism about its longitudinal axis, so as to position a selected side of said prism which has a scratch therein in a plane perpendicular to the Lorentz force, with the force being directed to said selected side.

4. The arrangement as recited in claim 1 wherein said block has the configuration of a cylinder with said first and second sides forming the base and top of said cylinder with said additional side comprising the rest of the cylinder outside surface, said additional side defining a scratch in the form of a helix.

5. The arrangement as recited in claim 4 further including means for rotating said cylinder about its longitudinal axis, so as to position a selected portion of said additional side to be perpendicular to the direction of the Lorentz force with the force directed thereto.

6. A tunable Gunn frequency generator comprising:

a block of preselected configuration of a semiconductor material which is capable of exhibiting the Gunn effect properties when an electric field as a function of current flowing therethrough exceeds a preselected value, said block having first and second end sides disposed at opposite ends of a longitudinal axis of said block and respectively defining anode and cathode contacts, said block further having an additional surface defining a plurality of additional sides which extend from said first and second sides, said additional sides being parallel to said longitudinal axis, and defining scratches each at a different distance from said anode contact;

a source of electric current having positive and negative terminals;

means connecting said anode and cathode contacts to said positive and negative terminals, respectively, whereby electric current flows from said source through said block between its anode and cathode contacts;

magnetic means positioned about said block for producing a magnetic field in a direction perpendicular to said longitudinal axis and parallel to at least one of said additional sides with the Lorentz force produced as a function of the magnetic field and the current flowing through said block being in a direction toward one of said additional sides; and means for controlling the relative position between said block and said magnetic means so that the Lorentz force is directed to one of said additional sides which has a scratch at a preselected distance from said anode contact.

7. The arrangement as recited in claim 6 wherein said block is an *n* side prism with each of said n sides extending from said first and second end sides in a direction parallel to the prism's longitudinal axis, each of said *n* sides defining a scratch, with the distance of each scratch from said anode contact being related by a preselected factor to the distance of the scratch of an adjacent side to said anode contact.

8. The arrangement as recited in claim 7 wherein said factor is 2.

9. The arrangement as recited in claim 7 wherein said means for controlling comprise means for rotating said prism about its axis so that a selected side of said *n* sides is in a plane perpendicular to the direction of said Lorentz force.

10. The arrangement as recited in claim 8 wherein said means for controlling comprise means for rotating said prism about its axis so that a selected side of said *n* sides is in a plane perpendicular to the direction of said Lorentz force.

11. The arrangement as recited in claim 6 wherein said block is a cylinder with said plurality of additional sides comprising the circular surface of said cylinder which extends from one end thereof to the other end, said circular surface defining a scratch in the form of a helix.

12. A frequency generator comprising:

a block of predetermined configuration of a semiconductor material which is capable of exhibiting Gunn effect characteristics, said block having first and second sides, disposed at opposite ends of a longitudinal axis of said block, and at least one additional side parallel to said longitudinal axis, said additional side defining a scratch therein;

a source of electrical current;

means connecting said first and second sides to said source to cause a current to flow in said block between said first and second sides in a direction aligned with said longitudinal axis; and means for providing a force in a direction perpendicular to said longitudinal axis to drive electrons passing in said block to the surface at said scratch.

13. The arrangement as recited in claim 12 wherein said block has a configuration of a multisided prism, with said first and second sides being the top and bottom of said prism and a plurality of additional sides extending from said first and second sides, each additional side defining a scratch therein at a different distance from a selected one of said first and second sides, each scratch being in a direction parallel to said selected one side, with one of said additional sides being in a plane perpendicular to the direction of said force.

14. The arrangement as recited in claim 13 further including means for rotating said prism about its longitudinal axis, so as to position a selected side of said prism which has a scratch therein in a plane perpendicular to the said force, with the force being directed to said selected side.

15. The arrangement as recited in claim 12 wherein said block has the configuration of a cylinder with said first and second sides forming the base and top of said cylinder with said additional side comprising the rest of the cylinder outside surface, said additional side defining a scratch in the form of a helix.

16. The arrangement as recited in claim 15 further including means for rotating said cylinder about its longitudinal axis, so as to position a selected portion of said additional side to be perpendicular to the direction of said force with the force directed thereto.

* * * * *